United States Patent [19]

Tschumi

[11] Patent Number: 5,094,403

[45] Date of Patent: Mar. 10, 1992

[54] SHOTCRETE GUN

[75] Inventor: Otto Tschumi, Frauenfeld, Switzerland

[73] Assignee: Sandoz Ltd., Basel, Switzerland

[21] Appl. No.: 505,862

[22] Filed: Apr. 6, 1990

[30] Foreign Application Priority Data

Apr. 8, 1989 [CH] Switzerland .................. 01304/89

[51] Int. Cl.⁵ .................................. B65G 53/46
[52] U.S. Cl. ............................. 239/654; 222/370; 222/636; 406/64; 406/66
[58] Field of Search ............. 222/636, 370, 278; 239/654; 406/66, 67, 63, 64, 182; 277/3, 103, 113, 126, 147

[56] References Cited

U.S. PATENT DOCUMENTS

| | | | |
|---|---|---|---|
| 3,909,068 | 9/1975 | Coucher | 406/63 |
| 3,995,777 | 12/1976 | Diez et al. | 222/370 |
| 4,376,600 | 3/1983 | Egli | 406/63 |
| 4,462,719 | 7/1984 | Egger et al. | 406/64 |
| 4,528,848 | 7/1985 | Hafner | 222/370 |
| 4,681,484 | 7/1987 | Egger | 406/63 |

FOREIGN PATENT DOCUMENTS

| | | | |
|---|---|---|---|
| 2734311 | 2/1978 | Fed. Rep. of Germany | 406/66 |
| 633779 | 12/1949 | United Kingdom | 406/63 |
| 742675 | 12/1955 | United Kingdom | 406/63 |

Primary Examiner—Andres Kashnikow
Assistant Examiner—Christopher G. Trainor
Attorney, Agent, or Firm—Gerald D. Sharkin; Richard E. Vila; Walter F. Jewell

[57] ABSTRACT

A shotcrete gun having a rotatable multichamber rotor, with a top feed hopper for receiving a dry concrete mixture in a chamber, and a bottom outlet pipe for discharging the dry concrete mixture from the chamber. The outlet pipe having a compressed air connector for connection to a compressed air source. The upper surface of the drum rotor adjoins a gasket having one or more openings fixed to a clamping plate. The lower surface of the drum rotor adjoins a gasket which is fixed to a base plate. The hopper and the outlet pipe being spaced such that a chamber which communicates directly with the hopper can be moved so that it no longer communicates with the hopper but communicates with the outlet pipe. The clamping plate has a compressed air connector for blowing the dry mixture out into the outlet pipe. And an opening for allowing compressed air to escape from the chambers, which opening is located between the position when the chamber communicates with the outlet pipe and the position when it communicates with the hopper outlet. A connection is provided in the upper gasket which connects to at least one chamber empty of concrete and one chamber containing concrete to equalize the pressure between the chambers.

6 Claims, 2 Drawing Sheets

FIG. 2
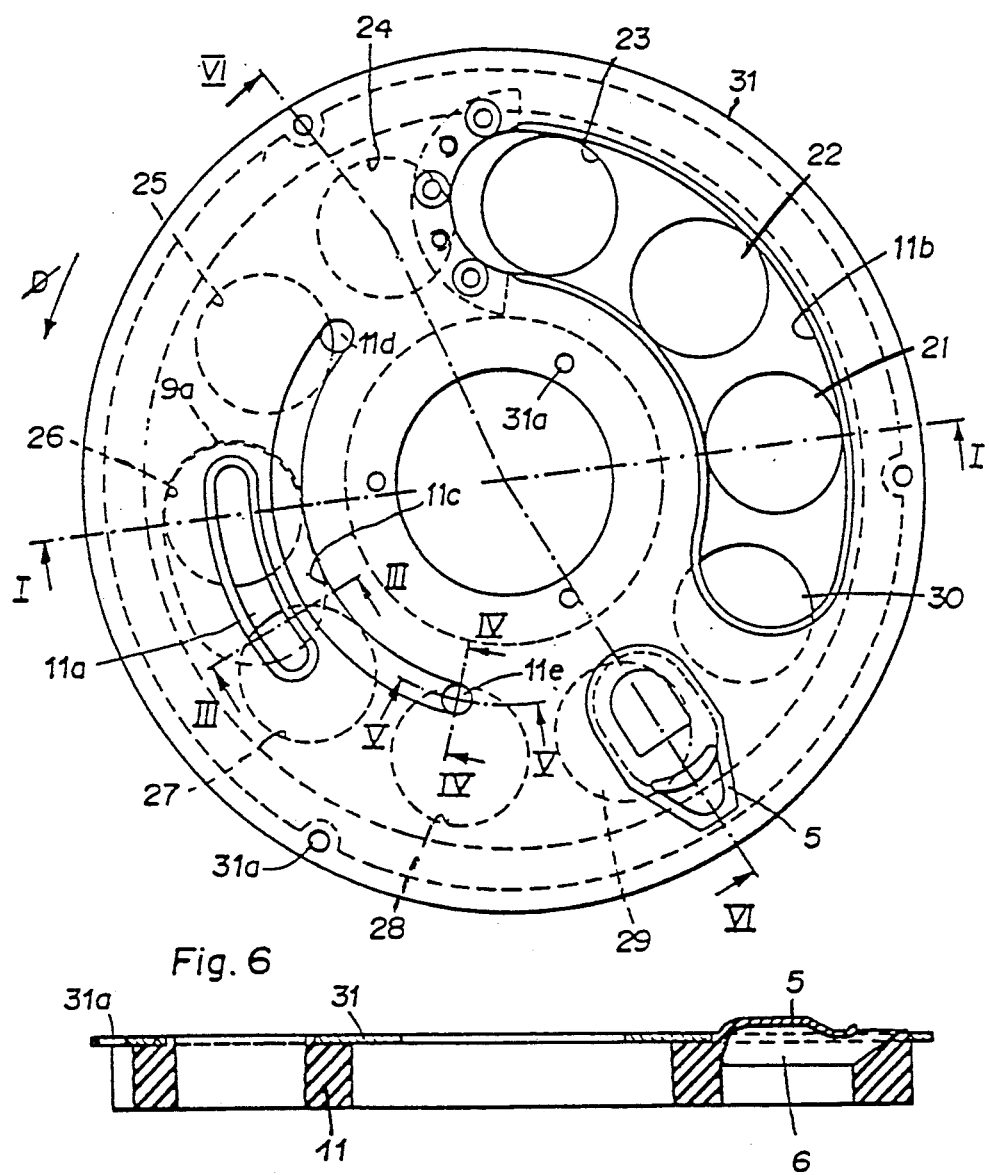
Fig. 6
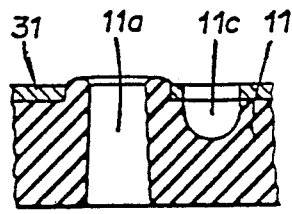
Fig. 3
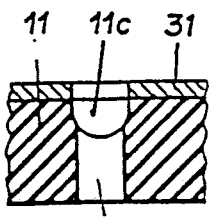
Fig. 4
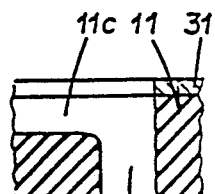
Fig. 5

SHOTCRETE GUN

Concrete spraying machines are known having a feed hopper for receiving dry concrete mixture and an outlet pipe having a compressed air connection for connector to a conveyer line. Between the hopper outlet and the outlet pipe, a motor-driven, multichamber drum rotor, rotatable about a vertical axis is provided. The upper surface of the rotor adjoins a gasket (the upper gasket) furnished with openings fixed to a clamping plate having similar openings. The rotor also has a lower surface which adjoins a gasket (the lower gasket) fixed to a base plate, into which the outlet pipe communicates. The clamping plate (at the top) and the base (at the bottom) are fixed so that the rotor can rotate between them; the gaskets separating the rotor from the plates. The rotor also has a number of chambers for receiving concrete such that at least one chamber always communicates at the top through an opening with the hopper outlet, but is not, at the same time, in communication with the bottom outlet pipe. By rotation, however, a chamber which communicates with the hopper can be moved so that it no longer communicates at the top with the hopper but communicates with the outlet pipe. The clamping plate contains a compressed air connector to blow the dry mixture out of the chamber located above the outlet pipe into the said pipe.

For the avoidance of doubt in this specification when a chamber is described as "communicating" with hopper or outlet pipe this means that concrete can pass from the hopper into the chamber or from the chamber into the pipe respectively.

The empty chamber must then have an internal pressure which is as least as great as the feed pressure in the outlet pipe to avoid the concrete being sucked back up from the pipe into the chamber. Upon rotation of the drum rotor, the empty chamber appears below the hopper outlet, where it is filled again. The pressure there cannot be greater than the pressure at the feed hopper, and so the clamping plate has an aperture in the region of the hopper opening, to allow the compressed air to escape from the rotor chamber which is under high pressure. Therefore, noise due to escaping compressed air is produced, as well as dust emission, and there is an energy loss.

It is an aim of the present invention to reduce this noise, dust emission, and loss of energy. According to the invention, there is provided a concrete spraying machine comprising a) a feed hopper (12) for receiving a dry concrete mixture;
b) an outlet pipe (15) having a compressed air connector (16) for connection to a compressed air source; and
c) a motor-driven, multi-chamber drum rotor (4) (said rotor having at least three chambers) rotatable around a vertical axis, arranged between the outlet of the hopper (12) and the outlet pipe (15), the upper surface of the drum rotor adjoining a gasket (11) (hereinafter defined as the upper gasket) having one or more openings fixed to a clamping plate (10), and the lower surface of the drum rotor adjoining a gasket (9) (hereinafter defined as the lower gasket) which is fixed to base plate (1), each chamber having openings capable of communicating with both the hopper (12) and the outlet pipe (15);

whereby the machine functions by having one or more chambers (21) that communicate with the hopper outlet, not communicating at the same time with outlet pipe (15), and one or more chambers (26) which communicate with the outlet pipe (15), not communicating at the same time with the hopper (12) at the time as it is connected to the outlet pipe (15), and whereby the clamping plate (10) contains a compressed air connector (17), for blowing the dry mixture out into the outlet pipe (15) and has an opening (6) for allowing compressed air to escape from the chambers (29), which opening (6) is located between the position when the chamber communicates with the outlet pipe (15) and the position when it communicates with the hopper outlet (in the drum rotor rotation sequence); characterized by a connection (11c) in the upper or lower gasket which connects at least one chamber (28) empty of concrete with at least one chamber (25) containing concrete to allow an equalising of the pressure between the chambers.

Preferably, the connection (11c) is between one chamber (28) located (in the drum rotor rotation sequence) between the position where the chamber so communicates with the outlet pipe and a position above or below the compressed air release outlet (6) (depending on whether the release outlet is above or below rotor 4); and at least one chamber (25) either located (in the drum rotor rotation sequence) at a position between the position where the chamber communicates with the hopper (12) and the position where the chamber communicates with the outlet pipe (15) or located at a position in which the chamber communicates with the outlet pipe.

Usually, the chambers containing concrete and empty of concrete (25 and 28) are not located in adjacent positions. When this is the case, then preferably the connection (11c) is such as to allow each chamber, in the drum rotor rotation sequence between the chamber (25) full of concrete and the chamber (28) empty of concrete to be connected and open into the connection (11c) so as to cause an equalising of the pressure between all of the chambers that are connected to the connection (11c).

Preferably, the drum rotor has nine or ten chambers, more preferably ten chambers.

Preferably, the connecting pipe (11c) is formed by a channel or a groove and two boreholes in the upper gasket (11) covered by the clamping plate (10) or is formed by a channel or a groove and two boreholes in the lower gasket (9) covered by the base plate (1), more preferably in the upper gasket (11) covered by the clamping plate (10).

The invention will be illustrated by the following figures in which

FIG. 2 shows a plan view on to the upper gasket of a machine according to the invention;

FIG. 3 shows a section along the line III—III of FIG. 2;

FIG. 4 shows a section along the line IV—IV of FIG. 2;

FIG. 5 shows a section along the line V—V of FIG. 2; and

FIG. 6 shows a section along the line VI—VI of FIG. 2.

Figure 1:
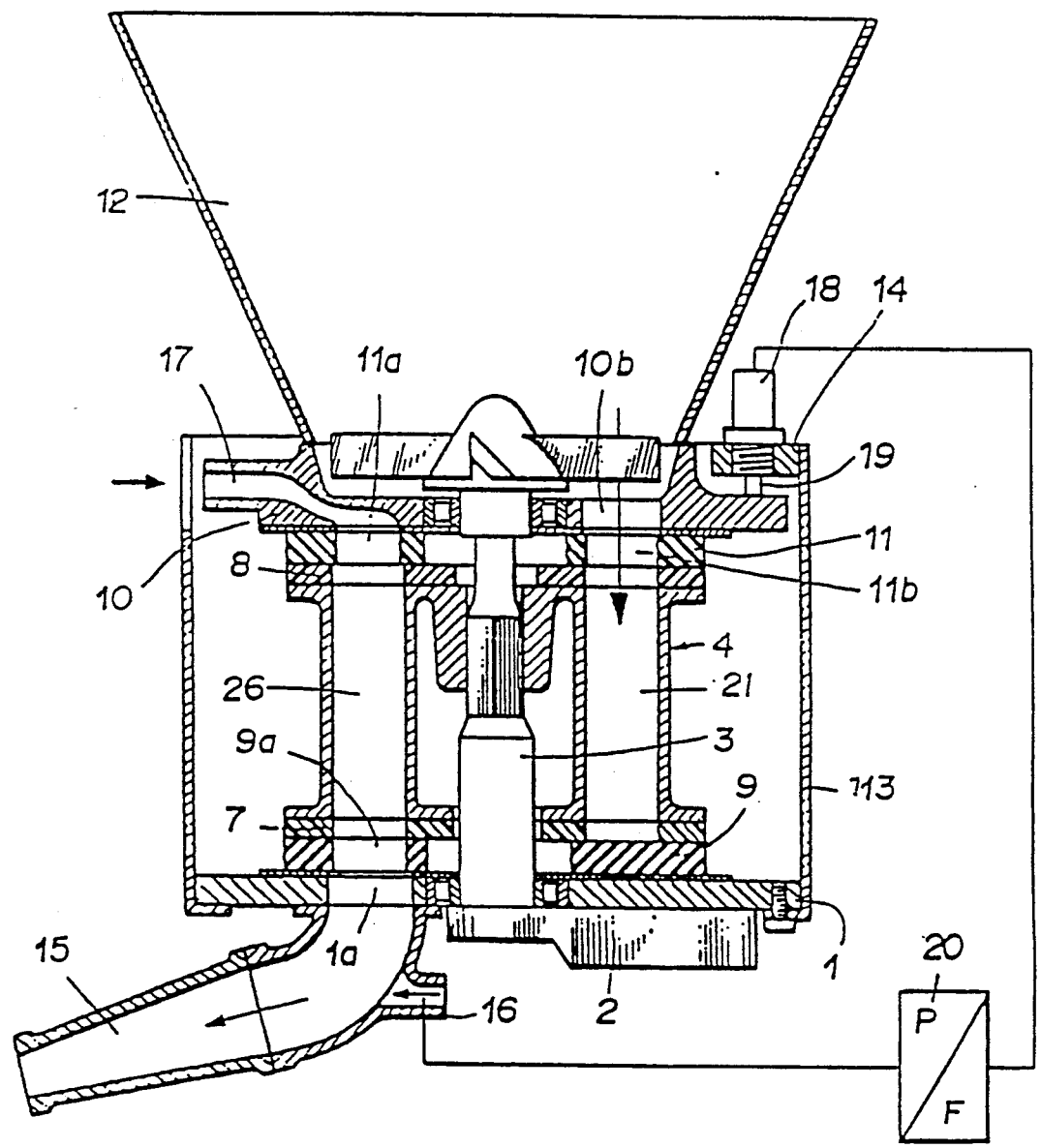
FIG. 1 shows a section through a machine according to the invention (along line I—I of FIG. 2)

In FIG. 1, a drive unit 2 mounted on a base plate 1 is shown. Spindle 3 is driven by the drive unit 2 and runs vertically through the base plate 1 of the drum rotor 4. The drum rotor 4 has ten internal chambers having parallel axes, only two of which are visible in FIG. 1, marked 21 and 26. The lower surface of the drum rotor 4 adjoins a friction disc 7 and the upper surface adjoins a friction disc 8. A lower annular rubber gasket 9 is fixed to the base plate 1, and the friction disc 7 (which is at the lower surface of the drum rotor 4) rests on this gasket 9. On its lower side, the gasket 9 has a vulcanised steel plate 9a, which protrudes slightly internally and externally beyond the gasket, whereby its two protruding edges have holes which serve to allow the gasket 9 to be attached by screws onto the base plate 1. The drum rotor 4 is positioned so as to be vertically slidable, so that the friction disc 7 can be brought to bear more tightly on gasket 9, once disc 7 and gasket 9 become thinner due to wear and tear. At the top end of the drum rotor 4 there is the clamping plate 10. On its lower side, clamping plate 10 has an annular rubber gasket 11. This gasket 11 is vulcanised onto a steel plate 31, which protrudes slightly internally and externally beyond the gasket 11 and has holes 31a (see FIG. 2) at its protruding edges, whereby the gasket 11 is fixed to the clamping plate 10 using screws which are placed through these holes. Feed hopper 12 is located to be rigidly or loosely fixed to a clamping plate 10 or may simply rest thereupon. A casing 13, which has strong ring 14 at its upper edge, is fixed to the base plate 1. Three hydraulic cylinders 18 (one of which is shown in FIG. 1) are screwed into this ring 14 at regular intervals and the piston rods 19 of these cylinders 18 exert a force on the edge of the clamping plate 10 to applying pressure from above. This presses the clamping plate 10 towards the base plate 1 with the result that the gaskets 9 and 11 are forced into contact with friction discs 7 and 8.

An outlet pipe 15 is located at the bottom of the base plate 1 for connection to a concrete feed pipe. This outlet pipe 15 has a compressed air connector 16 so that the concrete present in the outlet pipe can be forced by the pressurised air from a feed pipe (not shown) through connector 16 to the outlet pipe 15.

In order that the concrete may pass into the outlet pipe 15 from chambers 21 and 26, the base plate 1 and the gasket 9 fixed to the plate 1 have corresponding openings 1a and 9a to allow concrete to pass from the chamber 26 located above this opening 1a into outlet pipe 15.

The clamping plate 10 has an external compressed air connector 17 which opens into the aperture 11a of the gasket 11 above the openings 1a and 9a.

A further opening 10b in the clamping plate 10 and a further opening 11b in the gasket 11 enable concrete (due to gravity) to pass from the hopper 12 into the chamber 21 situated below (see FIG. 1). The force exerted by piston rods 19 of the hydraulic cylinders 18 tightly compress the vertically movable parts of the drum rotor onto base 1. The force is regulated so that it is sufficiently great to close sealingly the hollow cavities containing and directing the compressed air, without causing too much pressure which would accelerate wear and tear of the parts rotating against one another. The pressure cylinders 18 are not connected to a separate source of energy, but are linked by a pneumatic-hydraulic (PF) pressure converter 20 to the compressed air connector 16 in the outlet pipe 15, so that the pressure acting on the pressure cylinders 18 is always proportional to the pressure in the outlet pipe 15. With this control 20, when the pressure in the chamber 26 increases, the pressure acting on the clamping plate 10 increases, thus preventing any leakage between the lower gasket 9 and the base plate 1 and the upper gasket 11 and the clamping plate 10 where dust-filled compressed air could escape. When pressure in the outlet pipe 15 drops, the pressure on the clamping plate 10 is also reduced, so that the ease of the parts sliding on top of one another increases, which facilitates a longer life for these parts.

During operation of the machine, the cylinder of the drum rotor 4 rotates at a constant speed in an anti-clockwise direction, as indicated by the arrow D in FIG. 2. FIG. 2 shows where the individual chambers 21–30 are located, partly with dotted lines. In the position illustrated in FIG. 2, chamber 30 is located partially and chambers 21, 22, 23 totally below the opening 10b of the clamping plate 10, whose dimensions conform with the corresponding opening 11b of the gasket 11. This enables concrete present in the hopper 12 to pass through these openings 10b and 11b into the individual chambers until they are completely full. Upon further rotation of the drum cylinder, these chambers successively appear below the slot 11a, through which compressed air from connector 17 flows into the chambers, so that the concrete is blown out downwards through the opening 9a in the lower gasket 9, through opening 1a in the base plate 1 into the outlet pipe 15. From outlet 15, it is blown by compressed air coming in from the compressed air connector 16 into a conveyer line (not shown). Upon further rotation of the drum cylinder, the empty chambers, which are not filled with compressed air, are rotated to arrive below the compressed air release opening 6 which is partly covered by a lid 5 (see FIG. 2). This enables the pressure in chamber 29 to be reduced so that it is equivalent to the ambient pressure, in order that the chamber 29 when rotated further can be refilled, without any further action being needed to release compressed air once the chamber appears below the opening 11b again.

In FIG. 2 two bore holes 11d and 11e in the gasket 11 are shown, as well as the groove 11c connecting these two boreholes with one another, which together form a connector pipe between chamber 25 and chamber 28. Chamber 25 is situated (in the drum rotor rotation sequence) between a position under the hopper 12 and a position over the outlet pipe 15 and chamber 28 is located in the sequence between a position over the outlet pipe 15 and before a position under the compressed air release opening 6. Through this connector pipe formed by bore holes 11d and 11e together with groove 11c, part of the compressed air can pass from the chamber 28 (empty of concrete) into chamber 25 (filled with concrete) allowing the air to be expelled with the expulsion of the concrete, and the remainder of the compressed air can be released through excess pressure release opening 6. This enables compressed air to be used usefully, thereby saving on compressed air and energy when the chamber has to be vented before use below opening 11b. Further advantage is that the noise produced when the compressed air escapes is somewhat reduced.

What is claimed is:

1. A concrete spraying machine comprising—
   a) a feed hopper (12) for receiving a dry concrete mixture;

b) an outlet pipe (15) having a compressed air connector (16) for connection to a compressed air source; and c) a motor-driven multi-chamber drum rotor (4) rotatable about a vertical axis and having upper and lower surfaces and at least three chambers, the drum rotor being located between an outlet from the hopper (12) via which the dry concrete mixture can enter the chambers and the outlet pipe (15) through which the dry concrete mixture leaves the chambers, the upper surface of the drum rotor adjoining a gasket (11), hereinafter defined as the upper gasket) having one or more openings and being fixed to a clamping plate (10), and the lower surface of the drum rotor adjoining a gasket (9) (hereinafter defined as the lower gasket, which is fixed to a base plate (1), each of said chambers having openings capable of communicating with both the hopper (12) and the outlet pipe (15) but the arrangement being such that one of said chambers cannot communicate with both at the same time, the clamping plate containing a compressed air connector (17) for blowing the dry mixture out of the chambers and into the outlet pipe (15), and a compressed air release opening (6) for allowing compressed air to escape from the chambers (29), the opening being located, in drum rotation sequence, between a position where a said chambers communicate with the outlet pipe (15) and a position where said chambers communicate with the hopper outlet; characterized by a connection (11c) in the upper or lower gasket which connects at least one of said chambers (28) empty of said concrete mixture with at least one of said chambers (25) containing said concrete mixture to allow an equalizing of the pressure between the chambers.

2. A concrete spraying machine according to claim 1 in which the connection (11c) is between one said chamber 28 located in the drum rotor rotation sequence between the position where the chamber communicates with the outlet pipe and before a position of the compressed air release opening (6); and at least one said chamber (25) located in the drum rotor rotation sequence between the position where the chamber communicates with the hopper (12) and after the position where the chamber communicates with the outlet pipe (15).

3. A concrete spraying machine according to claim 1 in which the chambers (25) and (28) are not located in adjacent positions.

4. A concrete spraying machine according to claim 1 in which the drum rotor has nine or ten chambers.

5. A concrete spraying machine according to claim 1 in which the connection pipe (11c) is formed by a channel or a groove and two boreholes in the upper gasket (11) covered by the clamping plate (10).

6. A concrete spraying machine according to claim 1 in which the connection pipe (11c) is formed by a channel or a groove and two boreholes in the lower gasket (9) covered by the base plate (1).

* * * * *